United States Patent
Dhers et al.

(10) Patent No.: US 7,086,601 B2
(45) Date of Patent: Aug. 8, 2006

(54) CHIP CARD COMPRISING A MORE OR LESS RECTANGULAR FLAT SUPPORT

(75) Inventors: Gilles Dhers, Carnoux en Provence (FR); Frédéric Durano, Marseilles (FR); Guillaume Limousin, Cadolive (FR); Nicolas Housse, Rougiers (FR)

(73) Assignee: Gemplus, Gemenos Cedex (FR)

( * ) Notice: Subject to any disclaimer, the term of this patent is extended or adjusted under 35 U.S.C. 154(b) by 184 days.

(21) Appl. No.: 10/488,281

(22) PCT Filed: Sep. 5, 2002

(86) PCT No.: PCT/FR02/03020

§ 371 (c)(1),
(2), (4) Date: Mar. 2, 2004

(87) PCT Pub. No.: WO03/021526

PCT Pub. Date: Mar. 13, 2003

(65) Prior Publication Data

US 2004/0232246 A1 Nov. 25, 2004

(30) Foreign Application Priority Data

Sep. 5, 2001 (FR) .................................. 01 11698

(51) Int. Cl.
*G06K 19/06* (2006.01)

(52) U.S. Cl. ...................... 235/492; 235/487
(58) Field of Classification Search ............... 257/679; 235/437; 364/512; 700/184; 348/43; 356/614
See application file for complete search history.

(56) References Cited

U.S. PATENT DOCUMENTS

| 5,362,955 | A | * | 11/1994 | Haghiri-Tehrani | 235/492 |
| 5,936,227 | A | * | 8/1999 | Truggelmann et al. | 235/492 |
| 6,448,638 | B1 | * | 9/2002 | Fidalgo et al. | 257/679 |
| 6,685,097 | B1 | * | 2/2004 | Housse | 235/492 |

FOREIGN PATENT DOCUMENTS

| FR | 2 783 948 A1 | 3/2000 |
| WO | WO 99/38118 A2 | 7/1999 |

* cited by examiner

*Primary Examiner*—Karl D. Frech
*Assistant Examiner*—Kristy A. Haupt
(74) *Attorney, Agent, or Firm*—Buchanan Ingersoll PC

(57) ABSTRACT

A smart card includes a rectangular flat support having two longitudinal edges and two transverse edges. One portion of the front of the card receives at least one electrical contact pad. The support is provided with a rectangular slit which surrounds this portion in such a say as to define a mini-card. The mini-card can be detached from the support and is connected by means of at least two connecting links which extend respectively from one longitudinal edge of the mini-card towards the adjacent longitudinal edge of the card. Each of the connecting links has two grooves which can resist bending stresses and which are disposed opposite one another on each face of the support. The upper grooves of each link, which are disposed on the front face of the support, are different from one another such that the upper link which is disposed closest to one of the longitudinal edges of the support is less resistant to bending stresses than the other lower link.

14 Claims, 3 Drawing Sheets

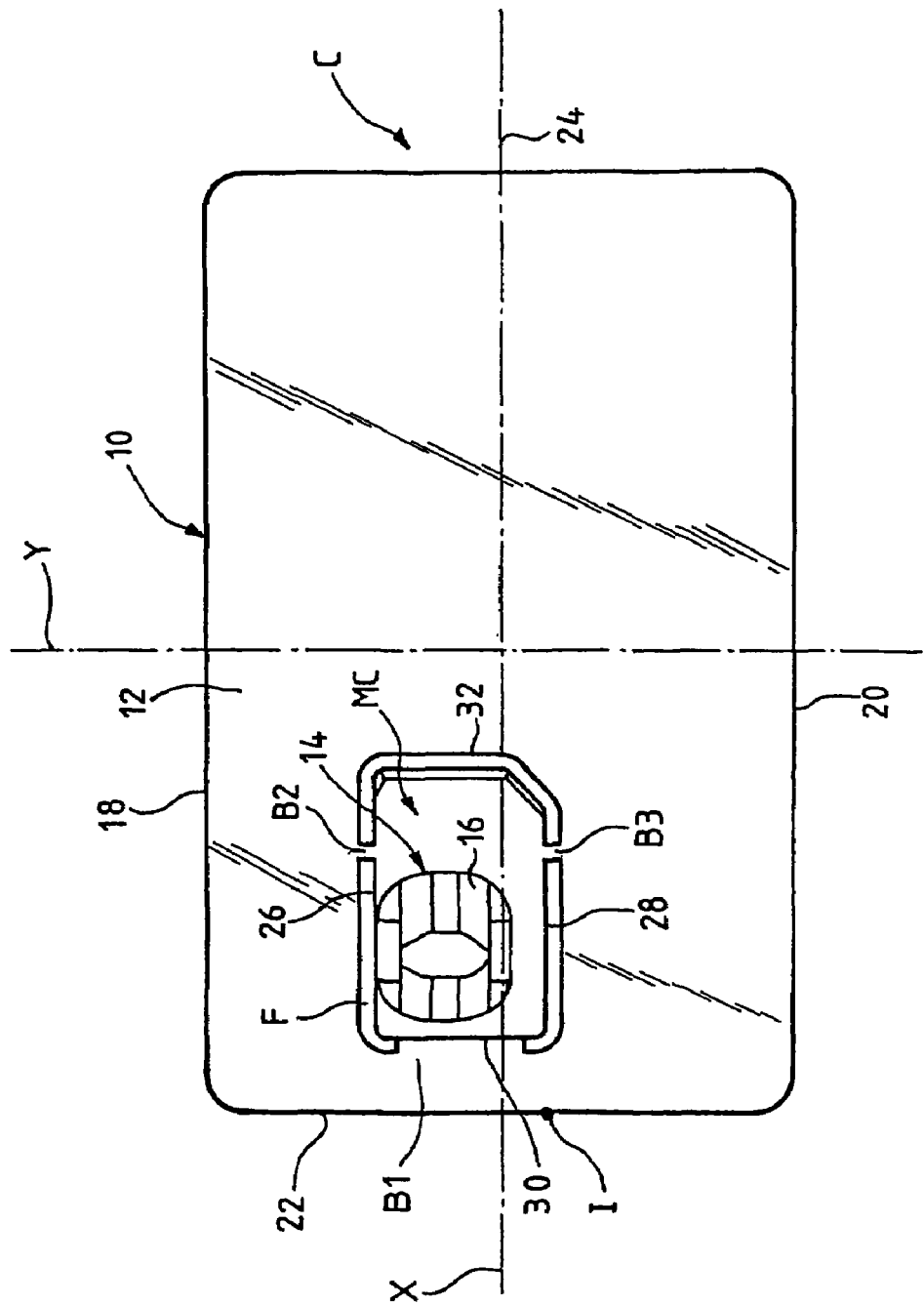

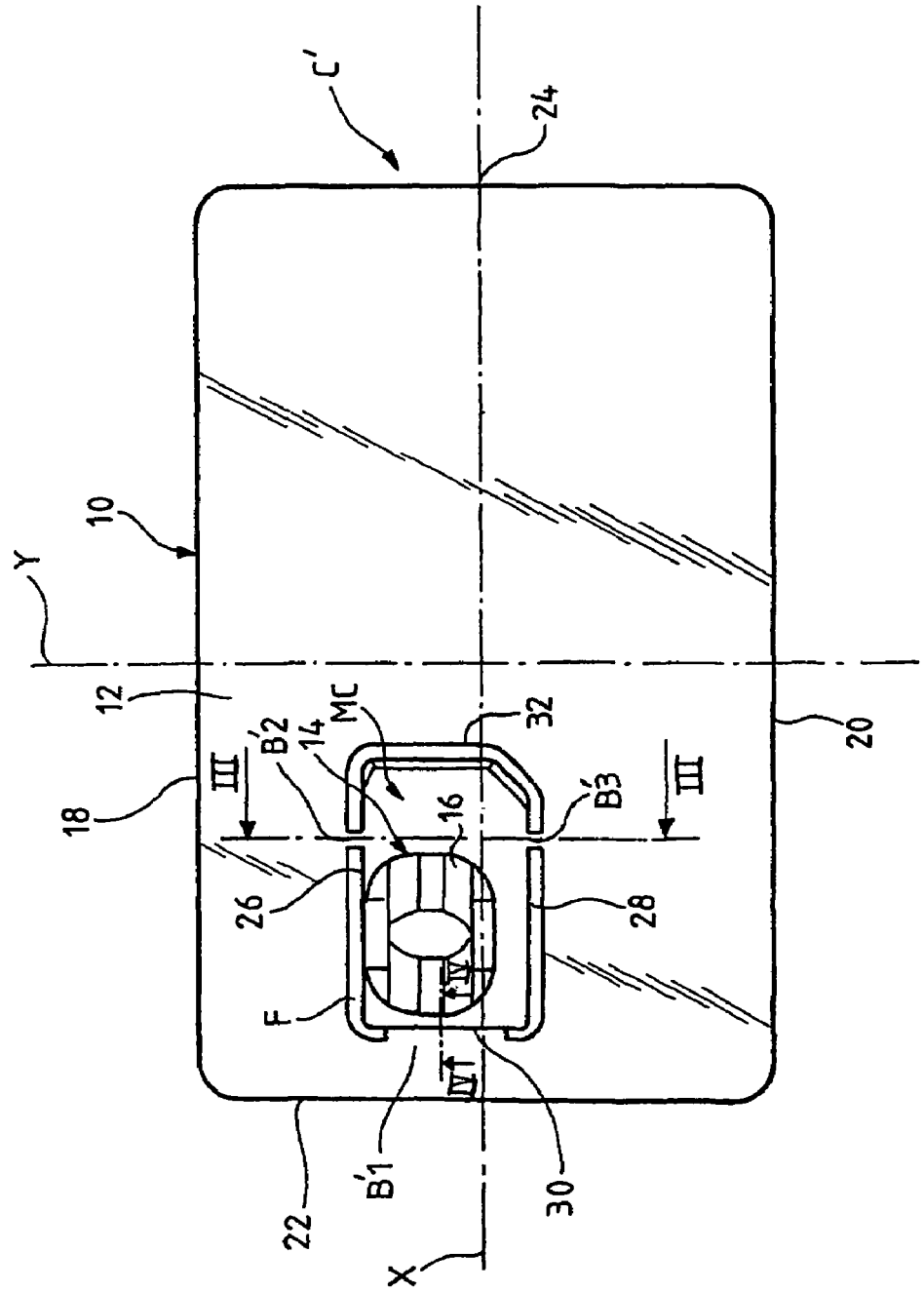
FIG_2

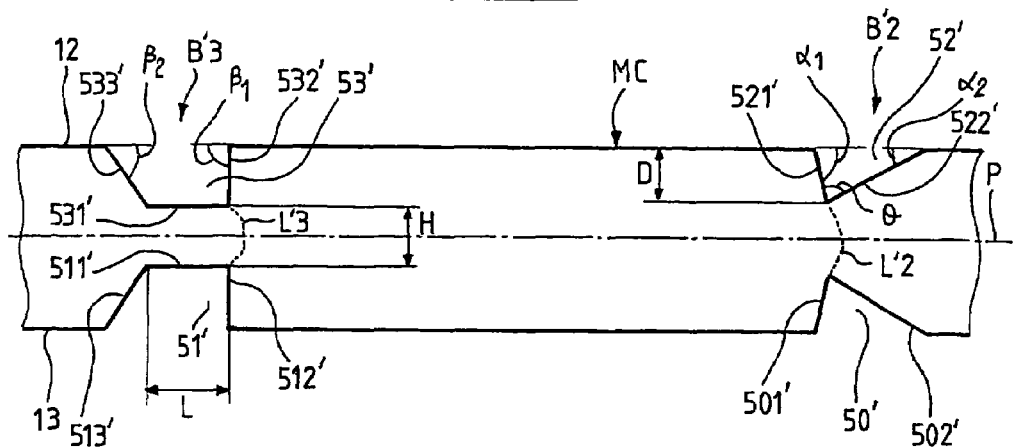
FIG_3
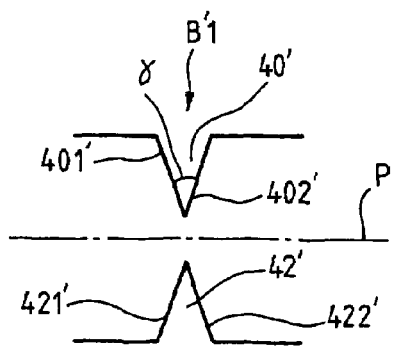
FIG_4

CHIP CARD COMPRISING A MORE OR LESS RECTANGULAR FLAT SUPPORT

This disclosure is based upon French Application No. 01/11698, filed Sep. 5, 2001, and International Application No. PCT/FR02/03020, filed on Sep. 5, 2002, the contents of which are incorporated herein by reference.

BACKGROUND OF THE INVENTION

The present invention concerns a card of the smart card type comprising a substantially rectangular flat support.

A card of the smart card type is a card with standardised dimensions and functions comprising one or more integrated circuits with electrical contacts. Such a card is described for example in the document WO 99/38118.

This card C comprises, as shown in FIG. 1, a rectangular flat support 10 having two longitudinal edges 18 and 20 substantially parallel to each other, and two so-called respectively front and rear transverse edges 22 and 24 substantially parallel to each other, perpendicular to the longitudinal edges 18 and 20 and with a length shorter than that of said longitudinal edges.

The support 10 is intended to receive, on a so-called functional portion 14, situated on the front side 12 of said support and in the vicinity of the front transverse edge 22, a series of electrical contact areas 16 associated with an electronic microcircuit (not depicted). The electrical contact areas 16 are used to connect this electronic microcircuit to an operating circuit belonging to a device comprising for example a connector in which the card is placed so that its contact areas cooperate with contacts of the connector.

Moreover, the support has a substantially rectangular slit F surrounding the functional portion, so as to delimit a mini-card MC detachable from the support 10 and connected thereto by at least two, and in general three, links B1, B2 and B3. The mini-card MC thus delimited has an outline substantially parallel to that of the support 10 of the card C.

Two of the three links, referred to as the top B2 and bottom B3 links, extend respectively from a longitudinal edge 26, 28 of the mini-card MC in the direction of the immediately adjacent longitudinal edge 18, 20 of the support 20. The top B2 and bottom B3 links each comprise two grooves opposite each other on each face of the support, making these links able to withstand bending and twisting forces whilst making it possible to detach the mini-card MC from the support 20 by pressure.

The third link B1, referred to as the large lateral link, generally extends from the transverse edge 30 of the mini-card closest to the front transverse edge 22 of the support 10 in the direction of this front transverse edge 22.

By virtue of these links, it is possible to convert the card C, which is for example a SIM (Subscriber Identity Module) card intended to be used in a portable telephone, into a SIM mini-card intended to be used in a smaller portable telephone, by detaching the mini-card MC from the card C by breaking the links for example by vertical manual pressure perpendicular to the plane of the support 10.

This design makes it possible to provide the user with a card that he can use according to one other of the formats (card or mini-card) according to the receiving device into which he has to insert the card.

In a known manner according to the document WO 99/38118, the section of the upper groove (that is to say the one situated on the front side 12 of the support 10) of each of the top and bottom links B2, B3 in a plane perpendicular to the plane of the support 10 and parallel to the transverse edges 22, 24 thereof is substantially trapezoidal in shape with its bases parallel to the plane of the support 10. This allows the top and bottom links to withstand standardised mechanical strength tests according to the ISO standard and comprising repeated bending cycles, without there being any damage to the chip or the support.

These bending cycles are of two types:

500 bends along an axis X parallel to the longitudinal edges and situated equidistant therefrom;

500 bends along an axis Y parallel to the transverse edges and situated equidistant therefrom.

Also in a known manner, the standardised position of the mini-card MC in the card C is such that the mini-card is not situated equidistant from the two longitudinal edges 18 and 20. Thus, the longitudinal edge 26 of the mini-card MC connected to the support 10 by the top link B2 is closer to the adjacent longitudinal edge 18 of the support 10 than the longitudinal edge 28 of the mini-card MC connected to the support 10 by the bottom link B3.

A conventional method of manufacturing the card consists of injecting the polymer plastic material intended to form the support 10 into a suitable mould. This injection makes it possible to form the card body as well as the mini-card and links simultaneously. Next, the various information that has to appear on the card is printed, then the support is varnished, and finally, it is put into a card.

The injection is such that the polymer material enters the mould by a so-called injection input I close to the front transverse edge 22 of the support 10 and the longitudinal edge 28 of the mini-card, carrying the bottom link B3.

The flow of material in the bottom link B3 is therefore directed from the card towards the mini-card; thus the chains of the polymer material are oriented in the bottom link in the direction of the mini-card. For this reason, during detachment of the mini-card, the breaking of the bottom link B3 takes place leaving a cut line going in towards the inside of the mini-card. On the contrary, the flow of material in the top link B2 is directed from the mini-card towards the card so that, during detachment of the mini-card, the breaking of the top link B2 takes place leaving a cut line going outwards from the mini-card, and this is greater the longer the base of the trapezium of the upper groove.

This poses a significant problem for the subsequent use of the mini-card in a connector. This is because the material jutting out beyond the mini-card interferes with the insertion of the mini-card into the connector with which it is intended to cooperate, which for its part is adjusted as close as possible to the standardised dimensions of the mini-card in order to provide correct and reliable contact of the contact areas of the mini-card with the contacts of the connector.

SUMMARY OF THE INVENTION

Furthermore, as the grooves of the top and bottom links are identical, they risk giving way at the same time during the ISO bending cycles, so that the mini-card is no longer attached by at least two links to the support of the card; consequently, the flatness of the assembly is not preserved and the ISO standard is no longer complied with.

The object of the present invention is to design a card of the smart card type described previously, having a bending strength meeting the ISO standards on the subject while allowing a detachment of the mini-card not leaving any material jutting out that is capable of hindering the insertion of the mini-card in a device with which it has to interact.

To that end the present invention proposes a card of the smart card type comprising a substantially rectangular flat support having two longitudinal edges substantially parallel to each other, and two so-called front and rear transverse edges substantially parallel to each other and perpendicular to said longitudinal edges, said support being intended to receive, on a so-called functional portion of said support situated on the front side thereof and in the vicinity of said front transverse edge, at least one electrical contact area, said support also having a substantially rectangular slit surrounding said functional portion, so as to delimit a mini-card detachable from said support and connected to said support by at least two connecting links, said mini-card having an outline substantially parallel to that of said support of said card, each of said links extending respectively from a longitudinal edge of said mini-card in the direction of the immediately adjacent longitudinal edge of said card, each of said links comprising two grooves opposite each other on each of the faces of said support, said grooves being capable of withstanding bending forces, characterised in that the so-called upper grooves of each of said links carried by the front side of said support are distinct from each other, so that the link closest to one of said longitudinal edges of said support, referred to as the top link, withstands the bending forces less than the other link, referred to as the bottom link.

By virtue of the invention, by choosing for the upper groove of the top link a configuration making it less capable of withstanding the bending forces, in particular a reduction can be made of the length of the base of the trapezoidal section of the section of this groove, which brings the breaking line nearer to the mini-card and therefore reduces the amount of material jutting out from the mini-card after detachment thereof.

This choice is not prejudicial as regards resistance to the bending stresses of the card. This is because, in view of the position of the mini-card in the card, the longitudinal bending axis passes through the mini-card closer to the transverse edge of the mini-card carrying the bottom link than to the other transverse edge.

As the bottom link is situated in proximity to the bending axis X, it is therefore this one that is subjected most to the bending stresses along this axis, whereas the top link is distinctly less subjected to the bending stresses along this axis, and can therefore have a section, for example V-shaped or in the shape of a trapezium having a base of short length, which makes it less resistant to the bending forces but brings the breaking line nearer to the edge of the mini-card.

Furthermore, by choosing for the upper groove of the top link a configuration making it less capable of withstanding the bending forces, it is ensured that, during the ISO bending cycles, the top link breaks before the bottom link, so that, when there are three links for connection of the mini-card to the support, there are always at least two links (the bottom link and the large lateral link) connecting the mini-card to the support.

According to one embodiment of the invention, the upper groove of the top link can have a section in a plane perpendicular to that of the support and parallel to the transverse edges of the support which is substantially V-shaped.

This section is particularly advantageous for reducing the material jutting out from the mini-card after detachment thereof.

In this case, the upper groove of the top link can be substantially parallel to the longitudinal edges of the mini-card and the leg of the V closest to the mini-card can make an angle with the front side of the support greater than that made by the leg of the V furthest away from the mini-card.

The residue of material is thus reduced as much as possible.

According to another embodiment of the invention, the upper groove of the bottom link can have a section in a plane perpendicular to that of the support and parallel to the transverse edges of the support substantially in the shape of a trapezium whose bases are parallel to the plane of the support.

The bottom link is thus given particularly high resistance to bending stresses.

In this case, the upper groove of the bottom link can be substantially parallel to the longitudinal edges of the mini-card, and the side of the trapezium closest to the mini-card can make an angle with the front side of the support greater than that made by the side of the trapezium furthest away from the mini-card.

This makes it possible to send the breaking line back as close as possible to the mini-card.

BRIEF DESCRIPTION OF THE DRAWINGS

Finally, the card according to the invention can also comprise a third link that extends longitudinally from the transverse edge of the mini-card adjacent to said front transverse edge of the support as far as the front transverse edge of the support.

Other characteristics and advantages of the present invention will emerge from the following description of one embodiment of the invention, given on an illustrative and in no way limiting basis.

In the following figures:

FIG. 1 depicts in a top view a smart card according to the prior art;

FIG. 2 depicts in a top view a smart card according to the invention;

FIG. 3 is an enlarged schematic view in cross-section along the line III—III of FIG. 2;

FIG. 4 is an enlarged schematic view in cross-section along the line IV—IV of FIG. 2.

DETAILED DESCRIPTION

In all these figures, common elements bear the same reference numbers.

FIG. 1 has been described in connection with the prior art.

FIG. 2 shows a card C' according to the invention. It differs from the card C of the prior art depicted in FIG. 1 by the structure of its connecting links, in particular the top link B'2 and the bottom link B'3, and also the large lateral link B'1.

According to the invention, the top B'2 and bottom B'3 links are such that the top link B'2 withstands bending forces less than the bottom link B'3, that is to say it breaks more easily during bending stresses imposed on the support 10 to which the mini-card MC is attached.

Just as in the prior art, the links B'2 and B'3 are aligned along one and the same transverse axis and in proximity to the functional portion 14. They have for example a width parallel to the axis X of between 1 mm and 1.2 mm.

FIG. 3 depicts in an enlarged view and in cross-section the card C' according to the invention along the line III—III of FIG. 2. It can be seen in this cross-section that each of the links, top B'2 and bottom B'3, comprises on the front side 12 of the support 10 a so-called upper groove 52' and 53'. According to the invention, the upper grooves 52' and 53' have sections distinct from each other.

Thus, the upper groove 52' of the top link B'2 has a preferably asymmetrical V-shaped section, and the upper groove 53' of the bottom link B'3 has a preferably asymmetrical section in the shape of a trapezium whose bases are substantially parallel to the plane of the support 10 (which is that of FIG. 4).

The grooves 52' and 53' form fracture starting points serving to facilitate the breaking, by manual pressure from the front side 12 towards the reverse side 13, of the links B'2 and B'3 with a view to detaching the mini-card MC from the support 10. In the embodiment illustrated in FIG. 3, corresponding so-called lower grooves 50' and 51' are made opposite respectively the grooves 52' and 53' on the reverse side 13 of the support. The grooves 50' and 51' are symmetrical respectively with the grooves 52' and 53' with respect to a median plane P of the support 10 passing between its front side 12 and its reverse side 13.

The grooves 52' and 50' therefore have an asymmetrical V-shaped section. The leg of this V 521' (respectively 501') closest to the mini-card MC forms an angle $\alpha_1$ with the front side 12 (respectively the reverse side 13) of the support 20 greater than the angle $\alpha_2$ formed between the other leg of this V 522' (respectively 502') and the front side 12 (respectively the reverse side 13) of the support 20.

According to one particular embodiment, $\alpha_1$ is equal to 75°, $\alpha_2$ is equal to 33° and the depth D of the groove 52' is 0.26 mm so that the angle $\theta$ between the two legs 521' and 522' of the V is equal to 72°.

Within the context of the invention, it is possible to choose these various parameters in the following intervals:

$$45° \leq \alpha_1 \leq 90°$$

$$15° \leq \alpha_2 \leq 45°$$

$$0.1 \text{ mm} \leq D \leq 0.3 \text{ mm}$$

$$45° \leq \theta \leq 120°$$

By choosing $\alpha_1$ greater than $\alpha_2$, the breaking line of the link B'2 is brought nearer to the mini-card MC, which reduces the amount of material jutting out from the mini-card after detachment thereof. The breaking line L'2 is depicted as a dotted line in FIG. 3.

Moreover, by choosing a V-shaped section for the upper groove 52' of the top link B'2, the latter is made less resistant to bending stresses, so that it is ensured that it breaks before the link B'3; thus, the mini-card MC is always attached by at least two connecting links, B'1 and B'3, to the support 10 during the bending cycles.

To obtain these results, there can also, more generally, be chosen for the upper groove 52' a section in the shape of a trapezium, but whose bottom is shorter than that of the trapezium of the upper groove 53'.

As for the grooves 53' and 51', these therefore have an asymmetrical trapezium-shaped section. The bottom 531' (respectively 511') of the groove 53' (respectively 51') constitutes the small base of this trapezium. The side of this trapezium 532' (respectively 512') closest to the mini-card MC forms an angle $\beta_1$ with the front side 12 (respectively the reverse side 13) of the support 10 greater than the angle $\beta_2$ formed between the other side of this trapezium 533' (respectively 513') and the front side 12 (respectively the reverse side 13) of the support 10. The breaking line L'3 of the link B'3 is depicted as a dotted line in FIG. 3.

According to one particular embodiment, $\beta_1$ is equal to 90°, $\beta_2$ is equal to 45°, the length L of the bottoms 531' and 511' is 0.25 mm and the distance H between said bottoms is 0.26 mm.

Within the context of the invention, it is possible to choose these various parameters in the following intervals:

$$60° \leq \beta_1 \leq 90°$$

$$30° \leq \beta_2 \leq 75°$$

$$0.1 \text{ mm} \leq L \leq 0.5 \text{ mm}$$

$$0.2 \text{ mm} \leq H \leq 0.6 \text{ mm}$$

The choice of $\beta_1$ greater than $\beta_2$, and preferably substantially equal to 90°, makes it possible to send the breaking line back as close as possible to the mini-card.

The choice of the angle $\beta_2$ and the length L has consequences on the printing of the card C'. This is because the grooves are not printable since the ink does not penetrate or does not penetrate properly to the bottom of the thinned area. Thus, $\beta_2$ must be as large as possible, and L as small as possible in order that the area devoid of ink is as small as possible. However, $\beta_2$ must also be sufficiently small to send the fragility back towards the mini-card, and L sufficiently large so that the decoupling between the mini-card MC and the support 10 increases, that is to say in order to increase the resistance to bending.

As for the height H, this must also be optimised since, if it is too small, it resists but does not break sufficiently easily, and, if it is too great, it breaks as early as the first bending cycles.

The intervals indicated above make it possible to satisfy these conflicting conditions.

The choice of a trapezium-shaped section for the upper groove 53' of the bottom link B'3 makes the latter very resistant to bending stresses, so that it is ensured that it breaks after the link B'2; thus, when the bending cycles are continued up to breaking of the top link B'2, there remain two points of anchorage, lateral and bottom, of the mini-card MC to the support 10 which preserves, even after breaking, the functionality of the card C'.

As for the large lateral link B'1, its structure can be identical to that of the link B1 of the prior art. Its width along the axis Y is relatively large, of the order of 11 mm, in order to give the mini-card MC and the card C' mechanical properties enabling them to withstand twisting and bending forces.

The large lateral link B'1 also comprises upper 40' and lower 42' grooves (see FIG. 4), symmetrical with respect to the median plane P of the support 10 and extending over the entire length of the link B'1.

For simplification with respect to the prior art, the grooves 40' and 42' have a symmetrical V-shaped section. According to one particular embodiment, the angle $\gamma$ between the two legs 401' and 402' (respectively 421' and 422') of this V is equal to approximately 30°, and the depth of these grooves 40' and 42' is approximately 0.32 mm.

Of course, the invention is not limited to the embodiment that has just been described.

In particular, the upper and lower grooves of one and the same link are not necessarily symmetrical with respect to the median plane of the support of the card. Nevertheless, their profile must be such that they contribute towards the fact that the top link is less resistant bending-wise than the bottom link.

Furthermore, the link B'1 can be replaced by two spaced out links, according to the principle described in the document WO 99/38118.

Moreover, more than three links can be used for attaching the mini-card MC to the support 10.

The width of the grooves of the different links can be less than that of the corresponding links.

In addition, the section of the grooves of the bottom link can be substantially trapezoidal, that is to say the bottom of these grooves, which corresponds to the small base of the trapezium, can be inclined with respect to the plane of the support instead of being parallel thereto. The same advantages of the invention are obtained as with a bottom parallel to the plane of the support.

Finally, any means can be replaced by an equivalent means without departing from the scope of the invention.

The invention claimed is:

1. A card of the smart card type comprising:
    a substantially rectangular flat support having two longitudinal edges substantially parallel to each other, and front and rear transverse edges substantially parallel to each other and perpendicular to said longitudinal edges;
    a functional portion situated on a front face of said support in the vicinity of said front transverse edge, for receiving at least one electrical contact area;
    a substantially rectangular slit surrounding said functional portion, so as to delimit a mini-card detachable from said support, said mini-card having an outline substantially parallel to that of said support of said card, and
    at least top and bottom links extending respectively from a longitudinal edge of said mini-card in the direction of an immediately adjacent longitudinal edge of said card to connect said mini-card to said support, each of said links comprising upper and lower grooves opposite each other on respective opposite faces of said support, said grooves being capable of withstanding bending forces, wherein the upper grooves of each of said links on the front face of said support are distinct from each other, so that the top link closest to one of said longitudinal edges of said support withstands the bending forces less than the bottom link.

2. A card according to claim 1, wherein said upper groove of said top link has a section in a plane perpendicular to that of said support and parallel to the transverse edges of said support which is substantially V-shaped.

3. A card according to claim 2, wherein said upper groove of the top link is substantially parallel to the longitudinal edges of said mini-card (MC), and the leg of said V closest to said mini-card makes an acute angle with the front face of said support greater than an acute angle made by the leg of said V furthest away from said mini-card with the front face.

4. A card according to claim 3, wherein the acute angle between the leg of said V closest to said mini-card and said front face is between 45° and 90°.

5. A card according to claim 3, wherein the acute angle between the leg of said V furthest away from said mini-card and said front face is between 15° and 45°.

6. A card according to claim 3, wherein the depth of said upper groove of said top link is between 0.1 mm and 0.3 mm.

7. A card according to claim 3, wherein said upper groove of said bottom link has a section in a plane perpendicular to that of said support and parallel to the transverse edges of said support substantially in the shape of a trapezium whose bases are substantially parallel to the plane of said support.

8. A card according to claim 7, wherein said upper groove of said bottom link is substantially parallel to the longitudinal edges of said mini-card, and the side of said trapezium closest to said mini-card makes an acute angle with the front face of said support greater than an acute angle made by the side of said trapezium furthest away from said mini-card with the front face.

9. A card according to one claim 8, wherein the acute angle between the side of said trapezium closest to said mini-card and said front face is between 60° and 90°.

10. A card according to claim 8, wherein the acute angle between the side of said trapezium furthest away from said mini-card and said front face is between 30° and 75°.

11. A card according to claim 7, wherein the length of the small base of said trapezium is between 0.1 mm and 0.5 mm.

12. A card according to claim 1, further comprising a third link that extends longitudinally from the transverse edge of said mini-card adjacent to said front transverse edge of said support toward said front transverse edge of said support.

13. A card according to claim 12, wherein said third link, has a section in a plane perpendicular to that of said support and parallel to the longitudinal edges of said support which is substantially V-shaped.

14. A card according to claim 1, wherein said support is obtained by molding.

* * * * *